US005202845A

United States Patent [19]

Andonovic et al.

[11] Patent Number: 5,202,845

[45] Date of Patent: Apr. 13, 1993

[54] OPTICAL SIGNAL PROCESSING METHOD AND APPARATUS USING COUPLED CHANNELS

[75] Inventors: Ivan Andonovic, Glasgow; Brian Culshaw, Kilmacolm; Mohammed Shabeer, Glasgow, all of England

[73] Assignee: British Telecommunications public limited company, London, England

[21] Appl. No.: 689,899

[22] PCT Filed: Oct. 19, 1989

[86] PCT No.: PCT/GB89/01241

§ 371 Date: Jun. 17, 1991

§ 102(e) Date: Jun. 17, 1991

[87] PCT Pub. No.: WO90/04823

PCT Pub. Date: May 3, 1990

[30] Foreign Application Priority Data

Oct. 20, 1988 [GB] United Kingdom ................. 8824625

Oct. 29, 1988 [GB] United Kingdom ................. 8825377

[51] Int. Cl.[5] ............................ G06F 1/04; G06E 1/02

[52] U.S. Cl. ....................................... 364/713; 385/24; 340/146.2

[58] Field of Search ...................... 364/713; 340/146.2; 385/24, 27

[56] References Cited

U.S. PATENT DOCUMENTS 3,245,035 4/1966 English ........................ 340/146.2 X 4,604,707 8/1986 Yamashita et al. .......... 340/146.2 X 4,859,019 8/1989 Bevan .................................... 385/24

FOREIGN PATENT DOCUMENTS 62-232625 10/1987 Japan .

2201534 9/1988 United Kingdom .

OTHER PUBLICATIONS

M. Shabeer et al., "Fiber-Optic Bipolar Tap Implementation Using An Incoherent Optical Source", Optics Letters, vol. 12, No. 9, Sep. 1987, pp. 726-728.

A. Tal et al., "Optical Residue Arithmetic Computer With Programmable Computation Modules", Applied Optics, vol. 18, No. 16, Aug. 1979 pp. 2812-2823.

*Primary Examiner*—Long T. Nguyen

*Attorney, Agent, or Firm*—Nixon & Vanderhye

[57] ABSTRACT

An optical signal processor (1) used with a method of processing optical data has at least one optical coupling unit (12). Each coupling unit (12) has two optical couplers (12A, 12B) which are connected so that principal channels (14) are connected in series with a time delay of a predetermined value between adjacent couplers (12A, 12B). The optical coupling units (12) are formed into stages. The number of optical coupling units (12) or stages determines further coding of each bit of the input optical signal or code sequence. Stages can be coupled together to process a sequence of optical pulses corresponding in number to the number of optical coupling stages in the system. The outputs of each stage are coupled via optical switches (18) to an optical summing device (24) to simultaneously process the coded data and determine whether the processing has resulted in matching or mismatching of data.

12 Claims, 2 Drawing Sheets

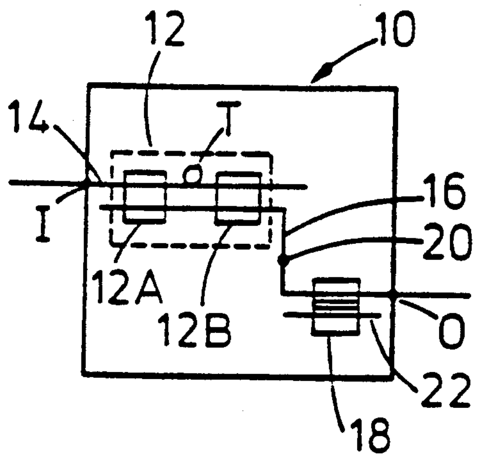
Fig. 1
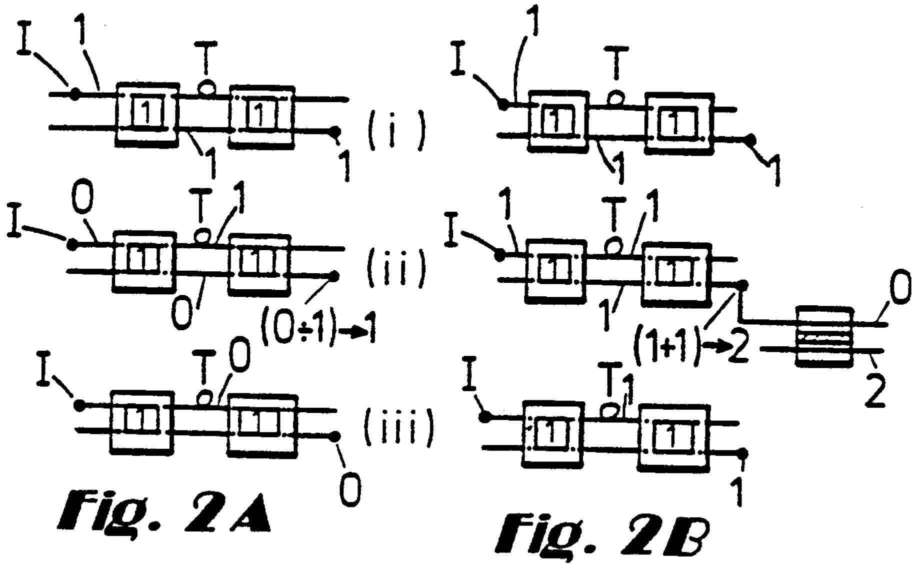
Fig. 2A
Fig. 2B
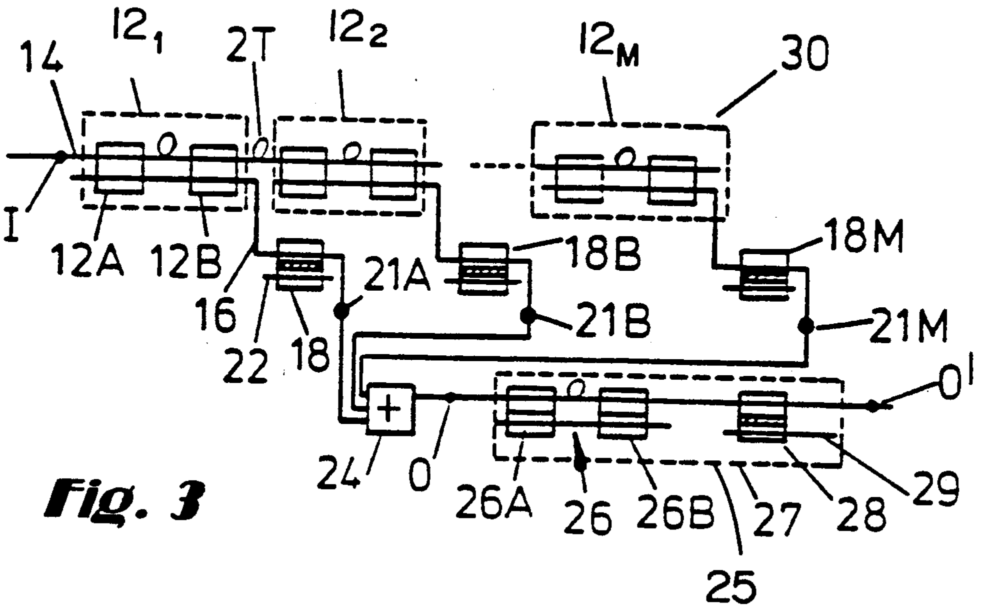
Fig. 3

OPTICAL SIGNAL PROCESSING METHOD AND APPARATUS USING COUPLED CHANNELS

BACKGROUND

I. Field of the Invention

The present invention relates to an optical signal processor and to a method of processing optical data.

II. Prior Art and Other Considerations

In communication systems spread spectrum techniques have been used and it is though that such techniques could offer several advantages in local area networks. In particular, spread spectrum optical communication techniques based on white light interference have been known for some time and recently these techniques have been used in coherence multiplexed optical fibre sensor systems.

Recently a spread spectrum technique, referred to as code division multiple access (CDMA) has been described for use with local area networks. In this scheme each user is assigned orthogonal codes, which results in a substantial increase of the bandwidth of the transmitted signal. However, the bandwidth requirements of this technique can only be supported by wide bandwidth channels such as a occur in fibre-optics, as well as requiring wide bandwidth signal processors at the receiver. Conventional receivers for CDMA use electronic processors, however, these are slow when compared with optical systems and also can be effected by electrical noise. It is desirable to provide an all-fibre and integrated optical processor which could facilitate and permit all optical processing so that maximum potential of such techniques can be realised.

SUMMARY

It is an object of the present invention to provide a signal processing system and a method and apparatus for processing optical signals which obviates or mitigates at least one of the aforementioned problems.

This is achieved by providing an optical processing element based on at least two optical couplers which are connected so that the principal channels are connected in series with a time delay of a predetermined value in the principal channel between adjacent optical coupling units. The optical coupling units are formed into stages and the number of optical coupling units per stage determines further coding of each bit of the input optical signal or code sequence. In other words, if the input code is M-bits long then M optical coupler stages are required to process this code and determine whether the code matches with the preset code sequence. Stages can be coupled together to process a sequence of optical pulses corresponding in number to the number of optical coupling stages in the system and the outputs of each stage are coupled via optical switches to an optical summing device to simultaneously process the coded data and determine whether the processing has resulted in matching or mismatching of data.

In one embodiment the data is coded in accordance with a Gold code sequence of M-bits length and two optical coupling units per stage of M stages are provided in the optical processing system.

According to a first aspect of the present invention there is provided an optical processing device for use in an optical communication system to determine the matching or mismatching of data, said optical processing device comprising at least two optical coupler units having a principal channel separated by a time delay T and a coupled channel having a minimal time delay in comparison to time delay T, each optical coupling unit being presetable to enable or to inhibit optical coupling of the input signal, the principal or coupled channels of the optical coupler being serially connected and the output of the optical processing device being taken from the optically coupled channel.

Preferably in the optical processing there are 2 optical coupler units having a principal channel with a time delay T between said coupler units such that for each optical input digit there is provided an optical output signal consisting of 2 outputs separated by time T.

Preferably the output of the optical processing device is coupled to optical switch means, said optical switch means being presetable to provide an output signal when the optical input signal exceeds a threshold value.

According to another aspect of the present invention there is provided an optical processing system, said optical processing system comprising a plurality of optical processing devices, each optical processing device having a plurality of optical coupling units of the same number, each optical coupling having a principal channel and a coupled channel, and within each optical processing device the principal channel between optical coupling units includes a time delay T where T is the time between successive pulses in the optical input signal, the principal channel of each optical processing device being coupled to principal channel of an adjacent optical processing device by a time delay nT where n is an integer and is the number of coupling units per stage, the output of each optical processing device being taken from the coupled channel and being coupled to a respective optical switch means, each optical switch means being presetable to provide an output signal when the input signal from each optical processing device exceeds a predetermined threshold, the output of each optical switch means being coupled in parallel to an optical summing unit for receiving the output of each optical switch means, the principal and coupled channels being dimensioned and proportioned such that the outputs of each optical switch means arrive at summing means substantially simultaneously, said optical summing means providing an optical output signal for each optical input signal into said optical processing system, said optical output signal consisting of a plurality of optical pulses corresponding to the number of optical coupler units in each optical processing device.

Preferably said optical processing system includes means for detecting the matching or mismatching of the optically processed data.

Preferably also each optical processing device includes two optical coupler units such that each optical input pulse is processed into two output pulses separated by time T, and the pulses are passed to respective switches from each optical processing device so that the output of the optical processing system consists of a stream of optical pulses, and within said stream one optical pulse represents whether data has been matched or mismatched and also the level of mismatch.

Preferably each coupling unit is programmable to vary the coding selected by the optical processing system.

Conveniently the optical processing system is coupled to synchronising means for synchronising the output pulses with the input pulses to determine whether matching or mismatching has occurred.

According to another aspect of the present invention there is provided a method of processing a sequence of optical pulses separated by a time T, said method comprising the steps of; passing said signals to an optical processing device, preselecting the coupling ratios in said optical processing device to provide a predetermined output code, providing an output from the optical processing device consisting of a sequence of output pulses, monitoring the magnitude of said output pulses and comparing the monitored value with a preset value, and providing a subsequent output depending on the result of the comparison.

According to another aspect of the present invention there is provided a method of processing optical data in an optical processing system, said optical data comprising a coded sequence of optical input pulses separated by time T, said method comprising the steps of;

processing each coded optical input pulse in an optical processing element into a processed signal, said processed signal having a plurality of optical output pulses separated by time T, comparing each processed signal from a respective optical processing element with a preset threshold value and providing a comparator output signal, coupling the comparator output signals in parallel to an optical summation means substantially simultaneously, summing the comparator output signals simultaneously to provide an optical system output, said optical system output comprising an optical signal having a plurality of optically summed pulses separated by time T, and each optically summed pulse having a magnitude determined by the number of optical processing elements and the matching or degree of mismatching in the optical processing system.

According to another aspect of the present invention there is provided a method of detecting the matching or mismatching of optically processed data, said method comprising the steps of;

coupling a plurality of optical processing elements together such that the principal channel of optical processing elements are connected in series via time delay elements, connecting the coupled channel of each of the optical processing elements to optical switch means, coupling the outputs of the optical switch means in parallel to a summing device, summing in parallel the outputs of said optical switch means in said summing device simultaneously to provide a summed output which is representative of the preset coding of the optical switch elements and the preset threshold values of the switch means, and monitoring the output to determine whether the data output is matched or mismatched with the input data.

Conveniently said summation of output data is completed when all of said optical processing elements are fully loaded.

According to another aspect of the present invention there is provided a method of detecting matching or the degree of mismatch in optically processed signals, said method comprising the steps of, monitoring the output of a summing device of an optical processing system, said output comprising a sequence of optical cumulative pulses corresponding to the sum of the outputs of a plurality of optical processing stages in said optical processing system, detecting when the first optical cumulative pulse exceeds a preset value, and subsequently triggering monitoring means to monitor the magnitude of the next cumulative pulse and providing an output indicitive of matching or the degree of mismatching depending on the value of the subsequent measured pulse.

According to yet another aspect of the present invention there is provided a method of detecting levels of mismatch in optically processed data, said method comprising the steps of, monitoring the output of a summing device for summing the outputs of a plurality of optically coupled stages in an optical processing system, determining the time taken to process each of the coded input pulses through the optical processing system, detecting the output pulses of the summation device, and synchronising the monitoring of the output of the summation device with the time taken to process the pulses to provide an output of matching or mismatching of the optically processed data from the optical processing system.

BRIEF DESCRIPTION OF THE DRAWINGS

Embodiments of the invention will now be described by way of example with reference to the accompanying drawings, in which:

FIG. 1 shows an optical processor having a pair of optical couplers in accordance with an embodiment of the invention;

FIGS. 2*a* and 2*b* show schematically the propagation of a pair of received optical pulses through the opticaL processor of FIG. 1;

FIG. 3 shows an optical processor system in accordance with an embodiment of the present invention having M optical processing stages.

DETAILED DESCRIPTION OF THE DRAWINGS

Figure 4A:
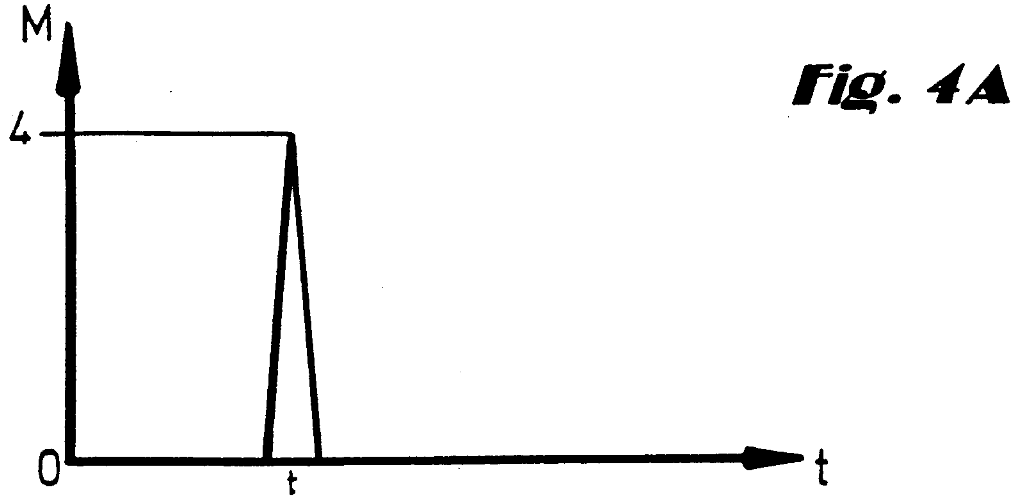
FIGS. 4A, 4B and 4C are graphs of light density versus time and display pulses received at the output of terminal 0 of the embodiment shown in FIG. 3.

With reference to FIG. 1 of the drawings there is shown an optical signal processor 10 for processing an input signal sequence of binary digits represented by light pulses, adjacent one of which are separated by time T. For convenience and ease of explanation in this embodiment the input signal consists of two digits separated by time T. The processor 10 comprises an input terminal I and an output terminal 0 between which is connected an optical coupler unit 12 having two optical couplers 12A, 12B. Each coupler 12A, 12B comprises a principal channel 14 with input and output ports and a coupled channel 16 also with input and output ports. The principal and coupled channels 14 and 16 are fibre optic waveguides which are disposed in close proximity within a support block, as is well known in the art, so as to influence the propagation of light from the principal channel to the coupled channel. The couplers 12A, 12B allow the adjustment of optical power passing between the principal and coupled channels 14 and 16. A delay device having a time delay (T) equal to the time between pulses is connected between the output port of the principal channel 14 of the first coupler 12A and the input port of the principal channel 14 of the second coupler 12B. The delay device is formed in the principal channel 14 by a length of waveguide (in this case optical fibre). The output port of the coupled channel 16 of the first coupler 12A is connected to the input port of the coupled channel of the second coupler 12B, a propagation delay dT being inherent in the connection and being considerably smaller than the time delay T of the principal channel 14. The pulsewidth pT of the binary digits, which are processed by the processor 10, are also shorter than the time delay T.

The output port of the coupled channel 16 of the second coupler device 12B is connected to the input port of the principal channel 20 of a switching device 18. The switching device 18 has a switching ratio between its principal channel 20 and its coupled channel 22 which is preset to enable or inhibit switching depending on whether the amplitude of the pulse in its principal channel exceeds a threshold value. Each coupler 12A, 12B of the coupler pair has a coupling ratio between principal and coupled channels which is preset to enable or inhibit coupling to be representative of a binary 1 or a binary 0 representative of binary 0.

The optical pulses to be processed are received at the input terminal I. The binary digits are representative of data which has been coded before transmission using a Gold code sequence. A binary digit pulse in the coded sequence having a value "1" is transmitted as 1,0 and a binary digit pulse having a value 0 is transmitted as 1,1. A '1' is the presence of a light pulse, and a '0' indicates the absence of a light pulse. By virture of this coding, the digits received also represent the address to which binary digits are to be sent.

FIGS. 2A and 2B schematically illustrate how the processor processes a 1,0 and a 1,1 input sequence respectively. The values of the transmitted form of digits match of fail to match the preset coupling ratios of the first and second coupling devices, 12A, 12B as will be evident from the following table.

| Input | Values Assigned to Couplers 12A, 12B by virtue of their coupling ratios | Output At O |
|---|---|---|
| 1,0 | 1,0 | 1,0 |
| 1,0 | 1,1 | 1,1 |
| 1,1 | 1,0 | 1,1 |
| 1,1 | 1,1 | 1,0 |

FIGS. 2A (i) to (iii) show an example of mismatch whereby a pulse train 1,0 is received at line input I but the couplers 12A and 12B represent a 1,1, configured coupler. With reference to FIG. 2A (i) at time t=0 the output at terminal 20 is "1", that is, there exists a pulse of light at terminal 20 because the first received pulse of the pulse train is a "1" and is partly coupled at coupler 12A from the principal channel 14 to coupled channel 16 and then to terminal 20 with a minimal delay dT due to propagation. After time T has elapsed the remainder of the first pulse will have propagated through the principal channel 14 and delay device T to coupler 12B where it is again partly coupled from channel 14 to channel 16 providing an output "1" at terminal 20. At the same instant the "0" received at input I enters coupler 12A. A '0' is representative of the absence of a light pulse; there being no light coupled in coupler 12A and the output is "0" which has no effect in the output of coupler 12B. Thereafter, the output remains a binary "1". After a further time T (that is, an interval of 2T from receiving the first pulse), the "0" enters coupler 12B and the output of terminal 20 is "0". Over the interval 2T the output is 1,1,0. As we are only interested in the first two digits, the last 0 at the output is redundant and can be disregarded, so for a mismatch between pulse train (1,0) received at input I and the binary digits (1,1) represented by the coupling ratios of the coupler, the output seen at terminal 20 is 1,1. From the above table, it will be appreciated that this mismatch also occurs for an input 1,1 with a preset coupling ratio of 1,0. However, where the input pulse sequence is 1,0 and the coupling ratios of couplers 12A and 12B are one and zero respectively, that is, a matching situation, an output of 1,0 is obtained at terminal 20.

FIGS. 2B (i) to (iii) show an example of matching wherein the output obtained at terminal 20 is not 1,0. In this example the coupling ratio of couplers 12A, 12B represent 1,1 and the input pulse train is 1,1. With reference to FIG. 2B (i) at time t=0, the output of terminal 20 is 1, because the first received pulse is a "1" and is partly coupled by coupler 12A from the principal channel 14 to the coupled channel 16 and then passes to terminal 20 with minimal propagation delay dT. In FIG. 2B (ii), after time T, the remainder of the uncoupled light pulse has propagated through the principal channel 14 and the delay device to coupler 12B where it is again partly coupled from channel 14 to channel 16 because the coupling ratio of coupler 12B represents a binary "1". Simultaneously the second received pulse enters coupler 12A. It is also partly coupled from channel 14 to channel 16 by virture of the coupler 12A coupling ratio and because the propagation delay dT of channel 16 is minimal compared with the delay T in channel 14, the pulse in channel 16 propagates to coupler 12B. Therefore, at terminal 20 a pulse having the effective value of "2" exists because at the same time part of the pulse received in coupler 12B has been coupled to channel 16. As described above the switching device 18 has a switching ratio which is preset to enable switching when the amplitude of the pulse at terminal 20 is greater than a preset threshold (for example 1.5) between 1 and 2. Consequently the output pulse having an effective value of 2 is "dumped" on line 22 of switch 18 and a 0 is present at the output.

After a further delay T, as seen in FIG. 2B (iii), the second received a "1" propagates through principal channel 14 and delay device to coupler 12B where is it partly coupled to channel 16. However, as mentioned above with reference to the FIG. 2A we are only interested in the first two digits, so, this output is 1,0 which is to be expected for matching. It will be appreciated that the switching device 18 will not "dump" any of the other outputs because no other output will exceed the threshold value.

Figure 4B:
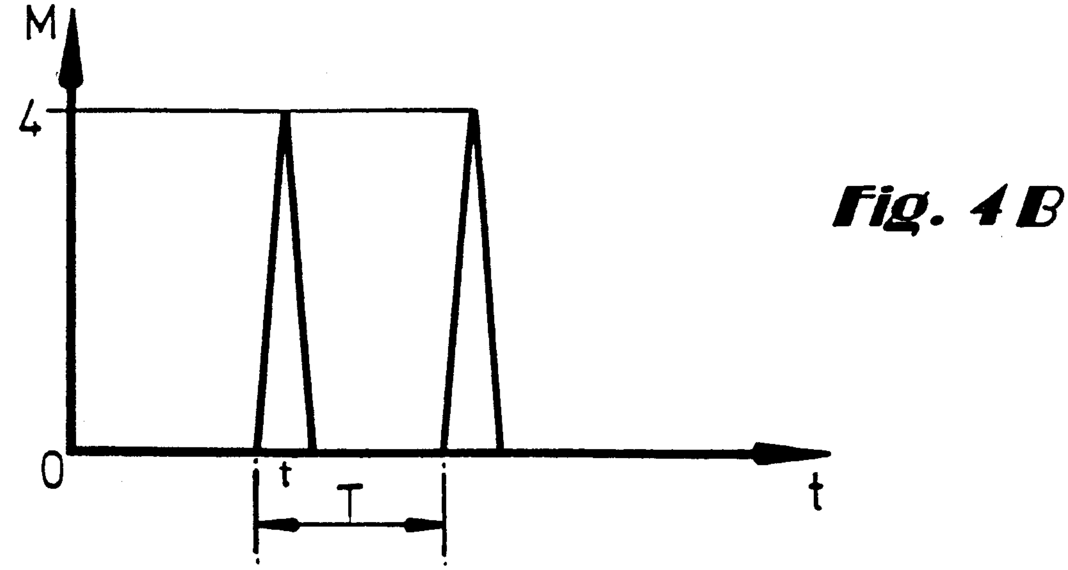

An embodiment of an optical signal processor is shown in FIG. 3 wherein there is provided an optical signal processor 30 having M stages, where M is the length of the coded sequence, for processing M pairs of first and second pulses as mentioned in the FIG. 1 embodiment. Each of the M pairs are separated by a time interval 2T. The processor has M stages of coupler pairs $\mathbf{12}_1$, $\mathbf{12}_2$, . . . $\mathbf{12}_M$ each pair having been described in the FIG. 1 embodiment and having respective input and output terminals. The principal channels of the coupler pairs are connected in series via a time delay 2T except for the coupler pair $\mathbf{12}^1$ and the output of the last coupler pair 12m. The output of channels 16 is connected to a respective switch element 18A, type hereinbefore described. It will be appreciated that the channel with the 2T delay is physically longer than the the T delay. Switches 18A, 18B etc. to 18M have outputs 21A, 21B, 21C . . . 21M which are connected in parallel to form M inputs of an M to one. The length of each of the waveguides is dimensioned so that channel arrive at the summing device 24 at the same time. The summing device 24 is connected to the output terminal O at signal is checked for matching as will be later described in Reference is now made to FIGS. 4A to 4C of the accompanying When the processor is fully loaded M i.e., when the first last coupler pair $12_m$; pairs of digits are processed in the M coupler stages and the sum of all the pairs is M for a perfect match. That is, for four stages the as seen in FIG. 4A (the match is 4×1.0)). FIG. 4B depicts the terminal O for a total mismatch and in this case the output is 4,4 which is sum of four mismatches, that is 4×1.1.

Figure 4C:
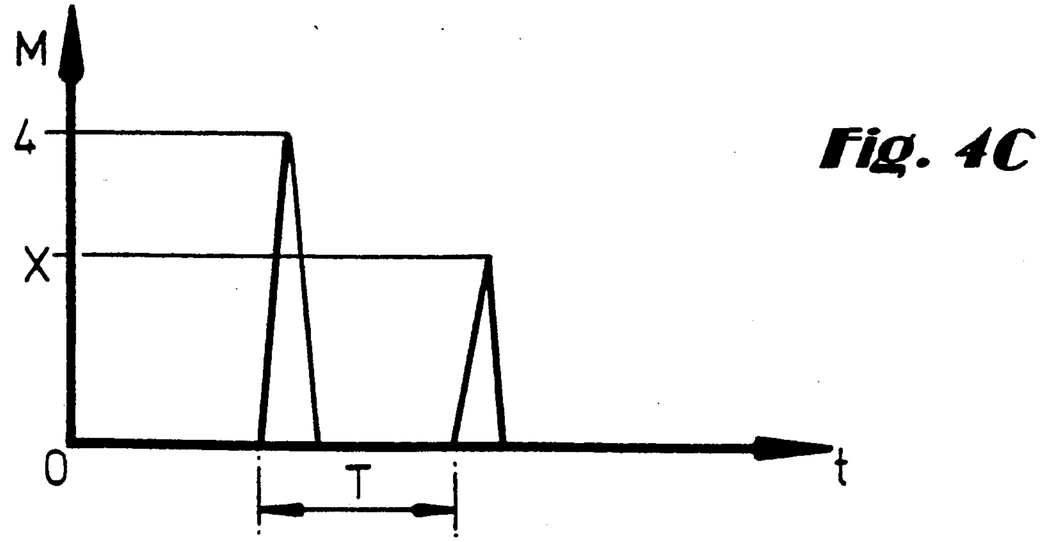

FIG. 4C depicts the output in the case of a partial case the output seen at terminal O is 4, X where X is 0 and 4.

As indicated above the aforementioned outputs shown C are obtained by adding all of the outputs of the M coupler summing device 24. For the input code sequence described, two interest are present at the output separated by time T. In the processing system shown the first signal is always a pulse of intensity M magnitude can be disregarded for the purpose of determining mismatching. It will be understood that the magnitude of the varies and this pulse can be used to indicated matching, total mismatching or partial mismatching of the input code sequence. second pulse is used as the sole indication of whether mismatching has occurred.

In the embodiment shown detection is carried out by first pulse of magnitude M, in this case a magnitude of 4 and the pulse is used to trigger a detector so that after a time T has magnitude of the next pulse detected will indicate whether the matched or mismatched. This is achieved by setting a threshold the first pulse or value M of 4 exceeds a threshold and circuit so that after a time T the next signal can be detected matching or mismatching. Detection is achieved using a monitors the output sequence and which indicates that the maximum pulse contains the matching information. An method is that there is no need to synchronize pulse detection of pulses input to the optical processing system. The enable the pulse to be monitored to be converted from light to voltage using for example, a then observed electronically on an oscilloscope or the like mismatch being readily quantifiable.

It will be appreciated that various modifications may be optical processing system and method hereinbefore described from the scope of the invention. In particular FIG. 3 shows a the embodiment hereinbefore described in which the matching mismatching can be detected using a pre-detection processor outline and generally indicated by reference numeral 25, which delay device 26 having an optical coupler pair 26A, 26B, the input of which is coupled to the output of the summing device 24. The output of the delay device 26 is coupled to the input of a of the same type as switching devices 18A, 18B etc. The 26B of the delay device 26 each have a 50% coupling ratio. This means that for an input pulse of magnitude n the output optical coupler 26A is n/2 and when this is passed to 26B the output is n/4. When a second pulse of zero for a perfect match the output from the second coupler 26B consists of n/4+0 because there is no output from the second matching pulse. The is fed to the switching device 28 and passes straight through perfect match between the input data and the sequence processor.

In the case of a total mismatch, that is, two pulses of n T, being received from the summing output of the summing device 26, the output couplers 26B is n/4. However, the output corresponding is also n/4 because of the 50% coupling ratio of each coupler. Therefore the output at time t+T is n/2(n/4+n/4) and this is dumped by the switch 28. The threshold of the switch 28 is set such that for any output n/4 it is dumped so that only an output indicative of a match is passed straight through the switch.

A further modification to the method of the detecting or mismatching has occurred is to synchronize a detector at an output of the summing device 24 such that the detector is switched to detect the pulse of interest at an interval equal to the sum of all the time delays of the processor, not including time delay 26 if the unit 25 is connected to the summing device. The pulse of interest is of course the pulse which indicates whether there is total matching, total mismatching or partial mismatching of input signal in the optical processing system.

This interval is given by the formula:

$$[(n-1)M+(M-1)n]T$$

Where

M is the number of stages

T is the time interval between successive pulses, n is the number of optical units per stage.

This means that for each input pulse after the time interval given by the above formula the switch is synchronised to detect whether matching or mismatching has occurred for the input data. However the aforedesired method of using the first received pulse of amplitude M as a trigger for sampling the next pulse is preferred because of its simplicity.

It will be appreciated that, by virtue of the pre-transmission coding of data, any number of pulses may be used to process an input binary pulse for example, in each stage three or more optical coupler units could be used to process (translate) each input pulse into three or more output pulses. The number of couplers in each stage determines the number of pulses per input binary digit. The expression N=nM determines the total number of pulses (N) received by the processor where n is the number of optical coupler unit per stage and M is the number of stages. Processing such data to determine matching or mismatching may be carried out as described above. It will be understood that in such an optical processing system the serially connected principal channel is provided and the coupled channel of each of the stages are connected in parallel to switching units which can be preset to pass selected outputs to a summing device in a manner as hereinbefore described.

It will also be understood that each of the stages is separated by time nT where n is an integer and is the number of couplers per stage and that the optical waveguide used to create the time delay nT can be a long length of optical fiber optic coiled onto a drum or the like. addition the Gold code sequence can be replaced by any other suitable code which has a large number of othogonal sequences which has an auto-correlation function as large as possible and with a cross-correlation function as small as possible.

A signal processor as hereinbefore described can be formed using discrete optical components or as a single integrated optical device. The principal advantage of an optical processing unit is speed of operation and immunity to noise. The optical processor has application in local area networks where a large number of assignable addresses are required.

In particular, it will be understood that the application in local area networks is to select a particular stream of data out of many such streams. Thus, the matching or mismatching performed by the optical processing system will enable signals having the correct header codes to be correctly selected. It will also be appreciated that the optical processing system hereinbefore described can be organized to increase or decrease the number of stages and the particular coding selected by the optical processing system can be varied by using individual couplers which are programmable. Therefore, stages in a particular optical processing system can be reconfigured by external programming to vary the coding sequence to match that of the input code and thus select a particular input signal of corresponding data. Such re-programming of the optical processing system can be done remotely from a central processing unit, or this could be achieved locally if it was known which particular code was to be received by the local station.

It will be also appreciated that the programmable device may be controlled electrically, optically or acoustically. Electrical control is preferred and includes an electro-optical substrate, such as lithium niobate, which allows an electrical signal to be applied to the couplers and the optical properties of the couplers to be set. This can result in a change in coupling ratio from an enable condition (that is, coupling) to an inhibit condition (that is, no-coupling) or vice-versa.

We claim:

1. An optical processing device for processing an optical data input to determine matching or mismatching between the data input and a predetermined reference, said optical processing device comprising at least two couplers each having a principal channel and a coupled channel, the principal channels of said couplers being connected in series with a time delay T between adjacent couplers, the coupled channels of said couplers being connected in series with a time delay between adjacent couplers which is minimal in comparison to time delay T, each optical coupler being presettable to enable or to inhibit optical coupling of an input data signal from its principal channel to its coupled channel, and the output of the optical processing device being taken from the coupled channel, wherein the output of the optical processing device is coupled to optical switch means, said optical switch means being presettable to provide an output signal when the optical input thereto exceeds a threshold value.

2. An optical processing device as claimed in claim 1, wherein there are two optical couplers, each having a principal channel with a time delay T between said couplers such that, for each optical input digit, there is provided an optical output signal consisting of two outputs separated by time T.

3. An optical processing system comprising a plurality of optical processing devices, each optical processing device having the same plurality of optical couplers, each optical coupler having a principal channel and a coupled channel, and within each optical processing device the principal channel between optical couplers includes a time delay unit of time delay T where T is the time between successive pulses in the optical input signal, the principal channel of each optical processing device being coupled to the principal channel of an adjacent optical processing device by a time delay nT where n is an integer and is the number of couplers per stage, the output of each optical processing device being taken from the coupled channel and being coupled to a respective optical switch means, each optical switch means being presettable to provide an output signal when the input signal from the respective optical processing device exceeds a predetermined threshold, the output of each optical switch means being coupled in parallel to an optical summing unit for receiving the output of each optical switch means, the principal and coupled channels being dimensioned and proportioned such that the outputs of each optical switch means arrive at said summing unit substantially simultaneously, said optical summing unit providing an optical output signal for each optical input signal input into said optical processing system, said optical output signal consisting of a plurality of optical pulses corresponding to the number of optical couplers in each optical processing device.

4. An optical processing system as claimed in claim 3, wherein said system includes means for detecting matching or mismatching of optically processed data with a predetermined reference sequence.

5. An optical processing system as claimed in claim 4, wherein each optical processing device includes two optical couplers such that each optical input pulse is processed into two output pulses separated by time T, and the pulses are passed to respective switches from each optical processing device so that the output of the optical processing system consists of a stream of optical pulses, and within said stream one optical pulse represents whether data has been matched or mismatched and also any level of mismatch.

6. An optical processing system as claimed in claim 3, wherein each coupler is programmable to vary coding selected by the optical processing system.

7. An optical processing system as claimed in claim 4, wherein the optical processing system is coupled to synchronising means for synchronising the output pulses with the input pulses to determine whether matching or mismatching has occurred.

8. A method of processing a sequence of optical pulses separated by a time T, the method comprising the steps of:

- passing said signals to an optical processing device comprising at least two optical couplers each having a principal channel and a coupled channel, the principal channels of said couplers being connected in series with a time delay T between adjacent couplers and the coupled channels of said couplers being connected in series with a time delay which is minimal in comparison to said time delay T;
- preselecting the coupling ratios in the couplers of the optical processing device to provide a predetermined output code;
- providing an output from the optical processing device consisting of a sequence of optical output pulses;
- monitoring the magnitude of one of said optical output pulses and comparing the monitored value with a preset value; and
- providing a subsequent output depending on the result of the comparison.

9. A method of processing optical data in an optical processing system, said optical data comprising a coded sequence of optical input pulses separated by time T, said method comprising the steps of:

- processing each coded optical input pulse in an optical processing element to form a processed signal, said processed signal having a plurality of optical output pulses separated by time T;

comparing each processed signal from a respective optical processing element with a preset threshold value and providing a comparator output signal;

coupling the comparator output signals in parallel to an optical summation means substantially simultaneously;

summing the comparator output signals simultaneously to provide an optical system output, said optical system output comprising an optical signal having a plurality of optically summed pulses separated by time T, and each optically summed pulse having a magnitude determined by the number of optical processing elements and the matching or degree of mismatching detected by comparators in the optical processing system.

10. A method of detecting matching or mismatching between an optical input data sequence and a predetermined sequence, said method comprising the steps of:

coupling together a plurality of optical processing elements each having a principal channel and a coupled channel, the principal channels of the optical processing elements connected in series via time delay elements which introduce a time delay T between adjacent optical processing elements, and the coupled channels of the optical processing elements being connected in series with a time delay which is minimal in comparison to said time delay T;

connecting the coupled channel of each of the optical processing elements to respective optical switch means;

coupling the outputs of the optical switch means in parallel to a summing device;

summing the parallel outputs of said optical switch means in said summing device simultaneously to provide a summed output which is representative of preset coding of the optical processing elements and preset threshold values of the switch means; and monitoring the output to determine whether the input data sequence and the predetermined sequence are matched or mismatched.

11. A method as claimed in claim 10, wherein said summation of output data is completed when all of the optical processing elements are fully loaded.

12. A method of detecting matching or the degree of mismatch between an optical input data sequence and a predetermined sequence, said method comprising the steps of:

monitoring an output of a summing device of an optical processing system, said output comprising a sequence of optical cumulative pulses corresponding to a sum of the outputs of a plurality of optical processing stages in said optical processing system;

detecting when the first optical cumulative pulse exceeds a preset value, and subsequently triggering monitoring means to monitor a magnitude of the next cumulative pulse and providing an output indicative of matching or the degree of mismatching depending on a value of the subsequent measured pulse.

* * * * *